(12) United States Patent
Sattler

(10) Patent No.: US 6,429,406 B1
(45) Date of Patent: Aug. 6, 2002

(54) CONTACT TIP

(75) Inventor: Richard Sattler, Köln (DE)

(73) Assignee: Alexander Binzel Schweisstechnik GmbH & Co. KG, Buseck (DE)

( * ) Notice: Subject to any disclaimer, the term of this patent is extended or adjusted under 35 U.S.C. 154(b) by 0 days.

(21) Appl. No.: 09/485,757

(22) PCT Filed: Aug. 13, 1998

(86) PCT No.: PCT/EP98/05138

§ 371 (c)(1),
(2), (4) Date: Feb. 15, 2000

(87) PCT Pub. No.: WO99/11417

PCT Pub. Date: Mar. 11, 1999

(30) Foreign Application Priority Data

Aug. 30, 1997 (DE) .......................... 197 37 934

(51) Int. Cl.⁷ ............... B23K 9/00; B23K 9/28
(52) U.S. Cl. ............... 219/137 R; 219/137.61
(58) Field of Search ............ 219/137.61, 137 R

(56) References Cited

U.S. PATENT DOCUMENTS

| | | | | |
|---|---|---|---|---|
| 4,342,878 A | * | 8/1982 | Wilson, II et al. ............. | 373/94 |
| 4,393,565 A | * | 7/1983 | Wilson, II et al. ...... | 29/157.3 R |
| 4,490,898 A | * | 1/1985 | Wilson, II et al. ....... | 29/402.13 |
| 4,575,612 A | * | 3/1986 | Prunier .................. | 219/137.43 |
| 4,706,679 A | * | 11/1987 | Schmidt et al. ............. | 128/639 |
| 4,733,038 A | * | 3/1988 | Giradin .................... | 219/69 W |
| 4,733,052 A | * | 3/1988 | Nilsson et al. ......... | 219/137.61 |
| 5,472,592 A | * | 12/1995 | Lowery ....................... | 205/137 |

FOREIGN PATENT DOCUMENTS

| | | |
|---|---|---|
| DE | 3304996 | 8/1984 |
| DE | 3427072 | 1/1986 |
| DE | 4217995 | 12/1993 |
| DE | 4410370 | 9/1995 |
| EP | 0 041 165 A1 | 5/1981 |
| EP | 0 399 334 A3 | 5/1990 |
| GB | 1 359 875 | 10/1971 |
| JP | 08081723 | 3/1996 |

OTHER PUBLICATIONS

"Was 1st Tiefbohren? Was 1st Präzisbohren" Jun. 1995 (an English Translation provided).
Manfred Weck, "Werkzeugmaschinen" (Machine Tools), 1980, pp. 113–115 (with English Translation).

* cited by examiner

*Primary Examiner*—Tom Dunn
*Assistant Examiner*—Zidia Pittman
(74) *Attorney, Agent, or Firm*—Foley Hoag & Eliot, LLP

(57) ABSTRACT

The invention relates to a contact tip for a welding or cutting torch which includes at least one internal opening for guiding and engaging at least one welding electrode, wherein the internal opening is produced by deep drilling in a bar-shaped semi-finished product, such as a solid material. The use of drawn semi-finished products can thus be eliminated, thereby widening the range of material selection and reducing the cost of the semi-finished product.

6 Claims, 2 Drawing Sheets

CONTACT TIP

FIELD OF THE INVENTION

The invention relates to a contact tip for a welding and cutting torch with one or several internal openings for guiding and contacting one or more welding electrodes.

BACKGROUND OF THE INVENTION

EP 41 165 A1 discloses an inert gas shielded arc welding torch with a contact tip of the aforedescribed type, which is referred therein as a contact tube. This component is attached to the tip of the inert gas shielded arc welding torch and guides the welding electrode to the starting location of the arc. The contact tip also supplies the relatively large welding current to the welding electrode. Due to the large current flow and the high thermal load, the contact tip is highly stressed. For this reason, the contact tip has until now been fabricated of drawn copper material, using an alloy consisting of electrolytic copper and copper-chromium-zirconium in the form of a semi-finished hollow material. The production tools and facilities and the manufacturing process for such drawn materials are quite complex, so that only a small number of suppliers are active in this market which is reflected in correspondingly high material costs. Another disadvantage is that special devices have to be manufactured for each specified nominal diameter and for each required tolerance. This poses a disadvantage in particular with small production runs. Drawn material is particularly disadvantageous since the characteristic material properties may change as a result of the heat treatment and the forming process. The heat treatment and the forming process causes changes in the material characteristics which adversely affect the surfaces and the wear characteristics of the internal opening.

Accordingly, it is an object of the invention to provide a contact tip for welding and cutting torches which can be produced more cost-effectively.

SUMMARY OF THE INVENTION

The object is solved by the invention by providing a contact tip which has at least one interior opening produced by deep drilling into the semi-finished product. Contact tips which can also be produced by drilling are known from GB-A 13 59 875, EP 399 344 A2 and the patent abstract of Japan 08 081 723, as far as the fabrication method is disclosed therein. Disadvantageously, however, the drilling process takes a long time and the internal produced surfaces do not have a sufficient accuracy.

Deep drilling is characterized by the use of tools capable of guiding lubricants and drilling fluid to the tip of the drill bit and forcing removal of the chips. Furthermore, deep drilling uses a high drilling speed, i.e., the produced chips are small in size and the drilling operation can run continuously because the chips are continuously removed.

According to a particular feature of this method, the flushing operation operates at an elevated pressure wherein the lubricants and the drilling fluid are guided along the drilling tool—inside a specified groove—to the tip, whereas the produced small drilling chips are removed to the rear. The chips are small enough to flow along the specified groove. In conjunction with specially developed tools and depending on the material, deep drilling can produce an accuracy in the range of IT 6 to IT 9 in a single processing step without subsequent finish treatment.

With the invention, materials can be employed which are significantly cheaper than the conventional materials currently in use. Moreover, materials spanning a large alloy composition range can be selected, so that the entire contact tip can be produced at lower cost. The fabrication process according to the invention is independent of the drawing characteristics of the material so that a greater variety of materials can be employed than is possible with conventional fabrication processes. Accordingly, specific material requirements can be taken into consideration which was not possible until now. For example, materials can be used which cannot be drawn at all or only with great difficulty. Also, materials can be used which cannot be produced at all or only with great difficulty in the form of a hollow profile (nozzle tube). The semi-finished product can be either a solid material or a tubular material.

For example, alloys can now be employed which cover a greater range with respect to the material characteristics, heat treatment, prior forming steps or the material history. Accordingly, a material can be selected which is optimized with respect to wear resistance and current transfer. With the invention, materials or semi-finished products can now be employed which could not be processed using the conventional fabrication process (drawing process). Unlike conventional materials, the semi-finished products made of the alloys according to the invention need no longer be ductile. Alloys can therefore be employed for the contact tips which until now were not deemed suitable for such an application.

Deep drilling also does not significantly affect the properties of the semi-finished products, so that their characteristic properties can be estimated or predetermined, without subsequently undergoing changes. As yet another advantage, the surface quality and the improved tolerances can be attained in a single processing step. With the improved tolerances, the current during the welding operation is transferred in a defined manner across the entire contact tip and the mechanical guiding is improved which in turn reduces the electrical, thermal and also mechanical wear.

Particularly advantageous is the improved manufacturability, since drawn semifinished products are eliminated. Instead, the semi-finished product can consist of simple metal rods in which the necessary opening(s) are later formed by deep drilling.

A contact tip of this type is preferably fabricated by clamping a rod-shaped material which is made of a desired alloy and has a desired outside diameter, in a conventional deep drilling machine and forming the one or several opening(s) in the semi-finished product by deep drilling. Deep drilling also produces a very precise interior surface, wherein the friction coefficient relative to the welding electrode can be accurately predicted and is not subject to variations.

Other objects, advantages, features and applications of the present invention are disclosed in the following a description of an embodiment with reference to the drawings. All described and /or illustrated features, either alone or in combination, form the subject matter of the present invention, independent of their combination or dependence in the claims.

DETAILED DESCRIPTION OF CERTAIN EMBODIMENTS

Figure 1:
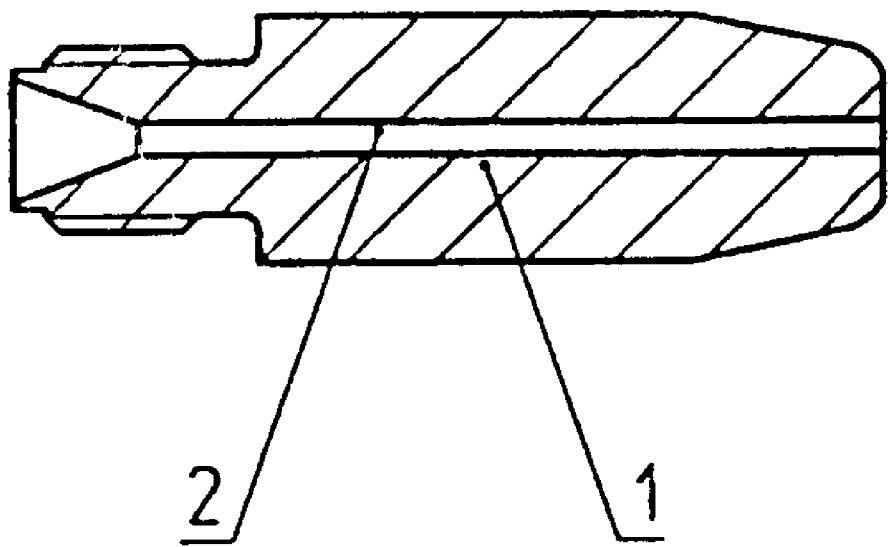
FIG. 1 shows a contact tip according to the invention.

The contact tip 1 according to FIG. 1 has, as is customary, a cylindrical form, wherein the tip may be formed with a slight conical taper. A thread which can be used to adapt the contact tip 1 to a welding or cutting torch is provided in the rear section of the contact tip 1. In this embodiment, the contact tip has an internal opening 2 extending therethrough and is provided at its rear side with a chamfer to facilitate insertion of the welding electrode. The form and shape of such welding nozzles is known in the art.

A novel feature is that the internal opening 2 is produced by deep drilling from a semi-finished material which may consist of a solid material or a tubular material. Unlike the conventional processes which rely on drawing of tubes or other elements already in hollow form, this approach allows a significantly greater selection of materials.

Figure 2:
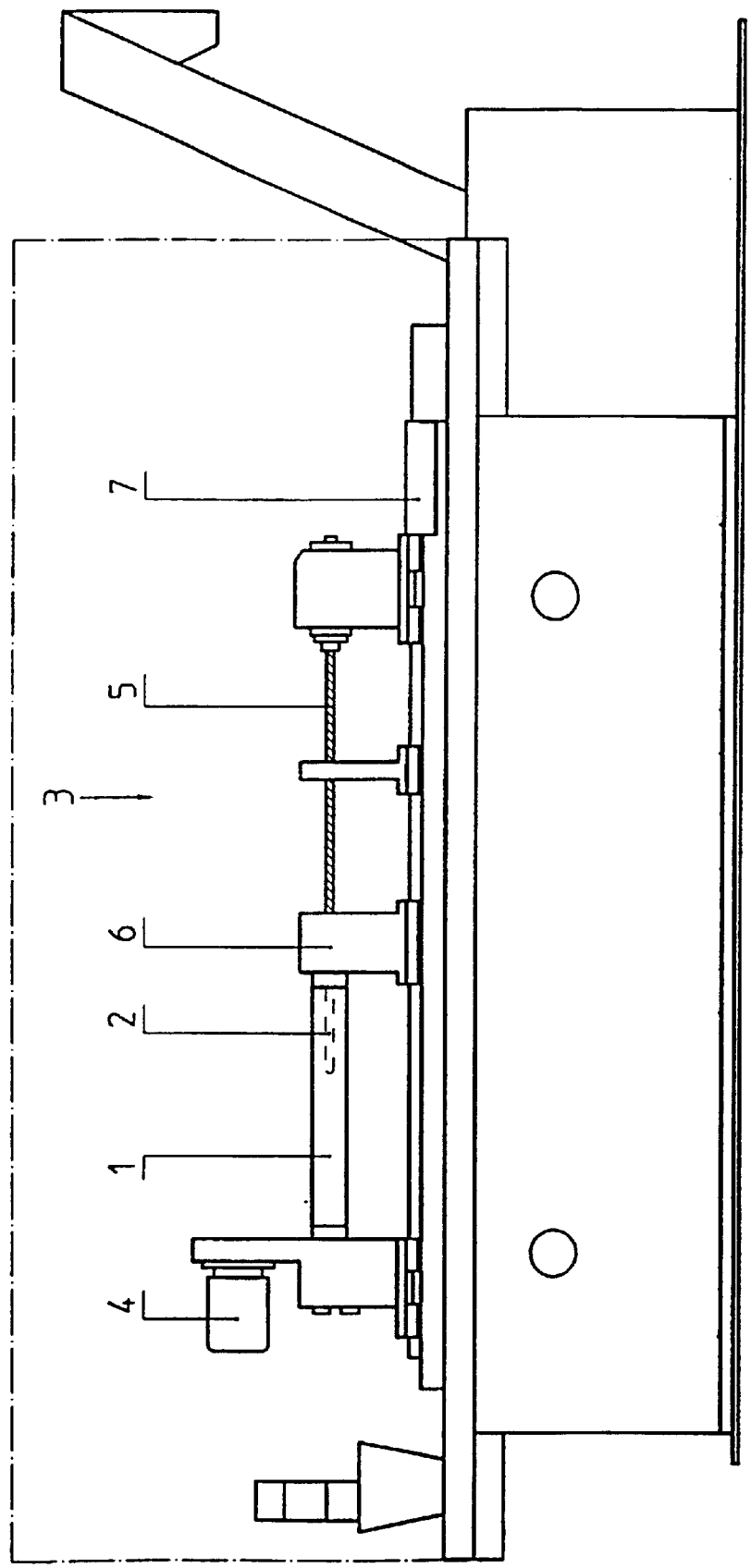
FIG. 2 shows a deep drilling machine.

FIG. 2 shows schematically a deep drilling machine 3 having as its major components the drive 4, the drill 5, the chuck 6 and the forward feed 7.

In this embodiment, the operating mode is selected so that the workpiece, in this case the contact tip 1, is secured in a stationary position, while the tool or the drill 5 rotates. This arrangement is commonly used when rotationally symmetric and asymmetric workpieces are deep drilled. To produce the internal opening 2, the drill 5 which is set in rotation by the drive 4, is slowly pressed into the contact tip 1 using the forward feed 7. The devices which are commonly used with deep drilling for flushing the drill bit and for removing the chips are not shown. When the machined workpiece is rotationally symmetric, deep drilling machines can be used where the tool, i.e. the drill 5, and the workpiece for the contact tip 1 rotate in opposite directions. Alternatively, the workpiece may rotate while the tool is stationary.

It is apparent that deep drilling employs relatively long drills 5 which have a special design and high rotation speed so as to produce small chips which can be removed rearwardly by flushing with oil. The deep drilling process can therefore operate continuously and produce the internal opening with the desired high quality in a single operating step.

I claim:

1. A method for producing a contact tip for welding or cutting torches comprising:

providing a road-shaped semi-finished product made from alloy resistance to being drawn;

clamping said road-shaped semi-finished product in a deep drilling machine; and deep drilling the rod-shaped semi-finished to produce the contact tip in a finished condition having at least one interior opening extending from one end to the product to an opposite end.

2. The method according to claim 1, wherein the semi-finished product is one of a solid alloy or a tubular alloy.

3. The method according to claim 1, further comprising:

flushing the interior opening with a pressurized lubricant when the interior opening is deep drilled; and removing chips produced during deep drilling from the interior opening.

4. A method for producing a contact tip for a welding or cutting torch, comprising:

deep drilling a semi-finished body made from an alloy resistant to being drawn;

generating at least one interior opening extending from one end of the body to an opposite end; and adapting the opening to receive and contact a welding electrode, wherein the interior opening is generated and adapted in a single operating step.

5. The method of claim 4, wherein the interior opening is provided with a taper at the opposite end to facilitate insertion of the welding electrode.

6. The method of claim 4, wherein the contact tip is made of an electrically conductive alloy other than a copper alloy.

* * * * *

UNITED STATES PATENT AND TRADEMARK OFFICE
CERTIFICATE OF CORRECTION

PATENT NO.    : 6,429,406 B1
DATED         : August 6, 2002
INVENTOR(S)   : Richard Sattler It is certified that error appears in the above-identified patent and that said Letters Patent is hereby corrected as shown below:

<u>Title page,</u>
Item [75], replace "KÖln (DE)" with -- Rilkestrasse (DE) --

Signed and Sealed this

Thirty-first Day of December, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,429,406 B1  
DATED : August 6, 2002  
INVENTOR(S) : Richard Sattler It is certified that error appears in the above-identified patent and that said Letters Patent is hereby corrected as shown below:

<u>Title page,</u>
Item [75], replace "Rilkestrasse (DE)" (as in Certificate of Correction issued December 31, 2002) with -- Kölm (DE) --.

Signed and Sealed this

Twenty-second Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,429,406 B1                                                Page 1 of 1
DATED         : August 6, 2002
INVENTOR(S)   : Richard Sattler It is certified that error appears in the above-identified patent and that said Letters Patent is hereby corrected as shown below:

<u>Title page,</u>
Item [75], replace "Rilkestrasse (DE)" (as in Certificate of Correction issued December 31, 2002) with -- Köln (DE) --.

This certificate supersedes Certificate of Correction issued April 22, 2003

Signed and Sealed this

Tenth Day of June, 2003

JAMES E. ROGAN
*Director of the United States Patent and Trademark Office*